United States Patent
Doocey

[11] 3,771,780
[45] Nov. 13, 1973

[54] CLAMPING DEVICE FOR AN ACCURATELY LOCATED WORKPIECE

[75] Inventor: Robert J. Doocey, Upper Saddle River, N.J.

[73] Assignee: Standard Tool & Manufacturing Co., Lyndhurst, N.J.

[22] Filed: Mar. 11, 1971

[21] Appl. No.: 123,268

[52] U.S. Cl.............. 269/153, 269/137, 269/224, 279/121
[51] Int. Cl.................... B23b 31/10, B25b 1/08
[58] Field of Search..................... 269/83, 104, 107, 269/138, 137, 217, 229, 153, 157; 214/1 BB; 279/60, 121, 123

[56] References Cited
UNITED STATES PATENTS

| 3,633,929 | 1/1972 | Morawski et al. | 279/60 X |
| 3,248,122 | 4/1966 | Roddy | 269/137 UX |
| 2,432,137 | 12/1947 | Burke | 269/153 X |
| 2,570,308 | 10/1951 | Beeth | 279/60 X |
| 3,428,190 | 2/1969 | Joichi | 214/1 BB |
| 3,512,794 | 5/1970 | Lohman | 269/138 |

Primary Examiner—Othell M. Simpson
Assistant Examiner—E. F. Desmond
Attorney—Harness, Dickey & Pierce

[57] ABSTRACT

A clamping device holds a workpiece in secured position by engaging the outer side walls thereof after the workpiece had been accurately located on a support from the inside surface thereof. After the workpiece is so located a plurality of spring pressed plungers independently move locking heads longitudinally and at an angle toward the workpiece side walls which are engaged thereby and which retains the workpiece in exact internal surface located position after the locating device is withdrawn.

8 Claims, 4 Drawing Figures

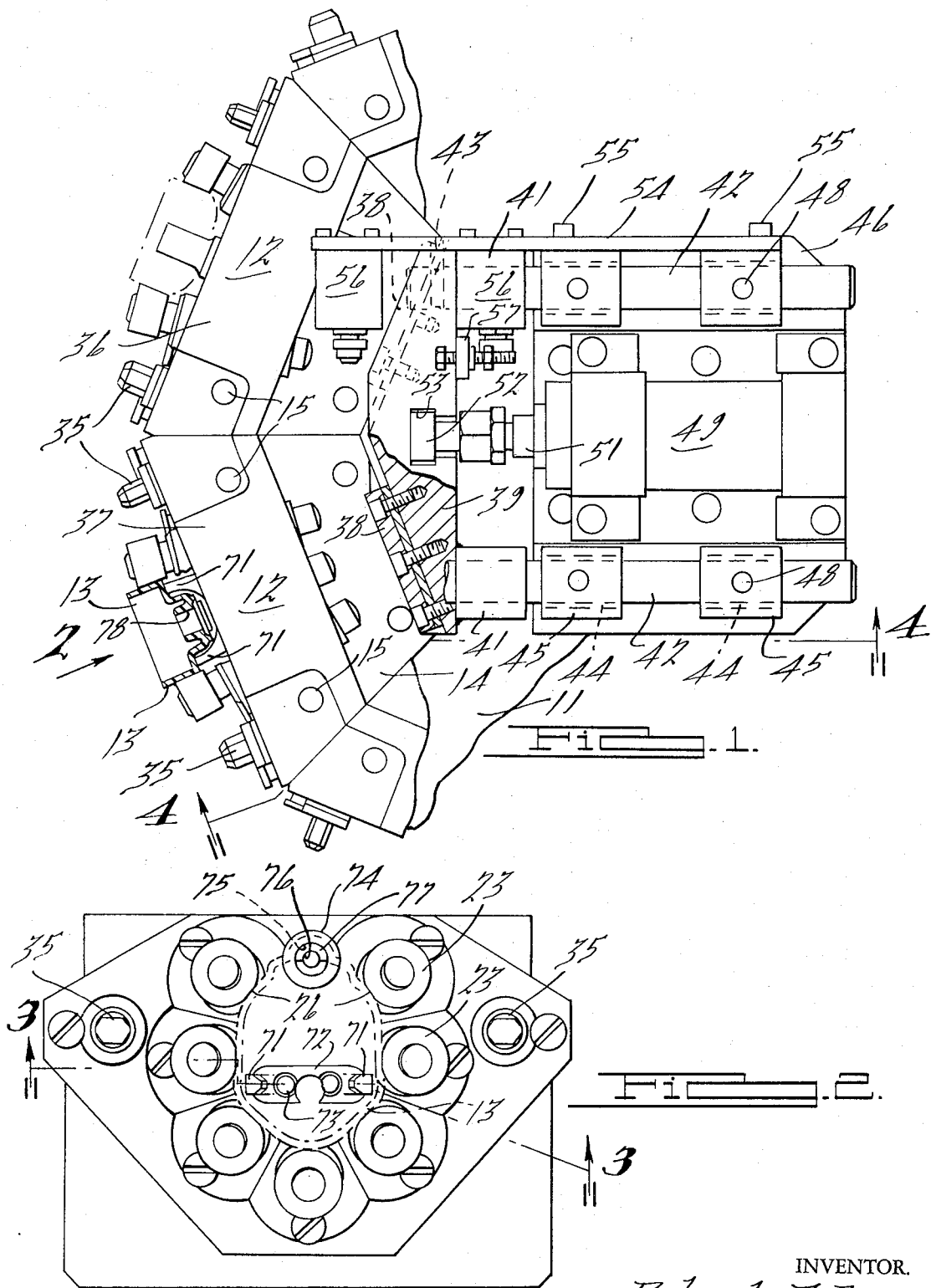

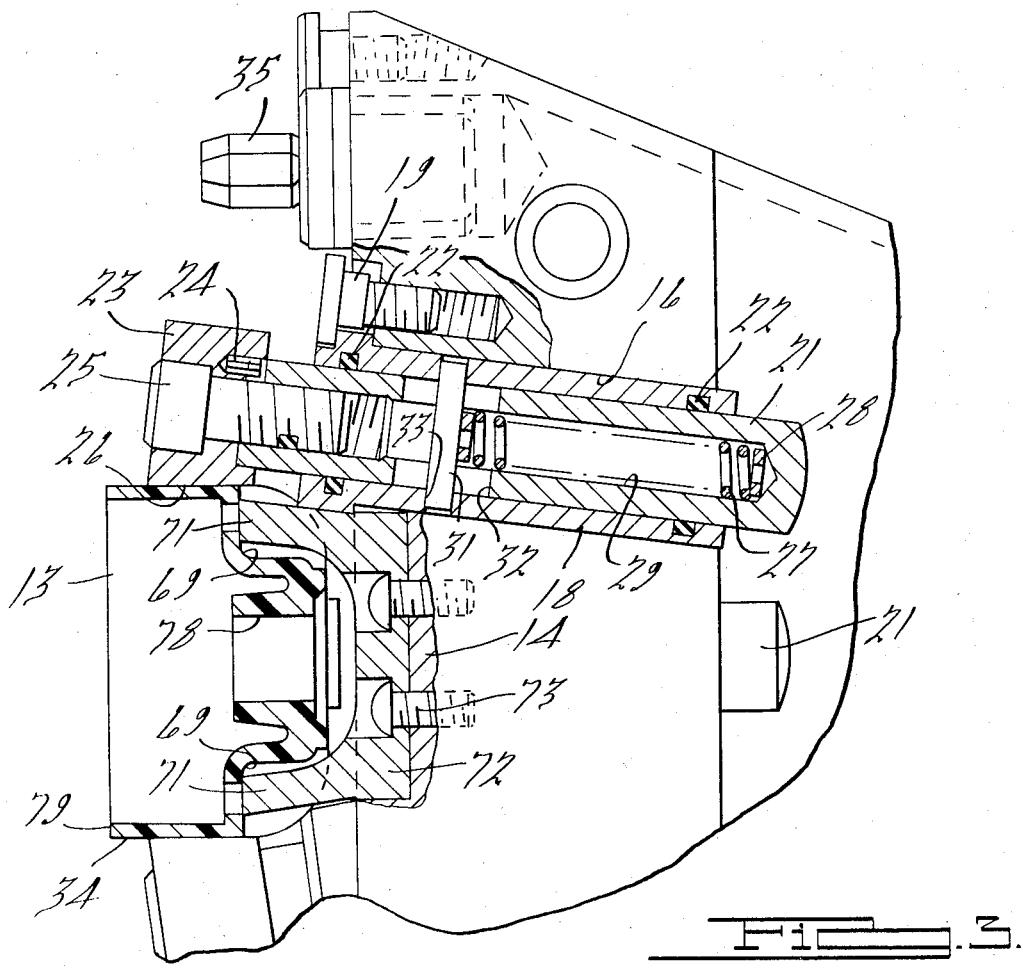

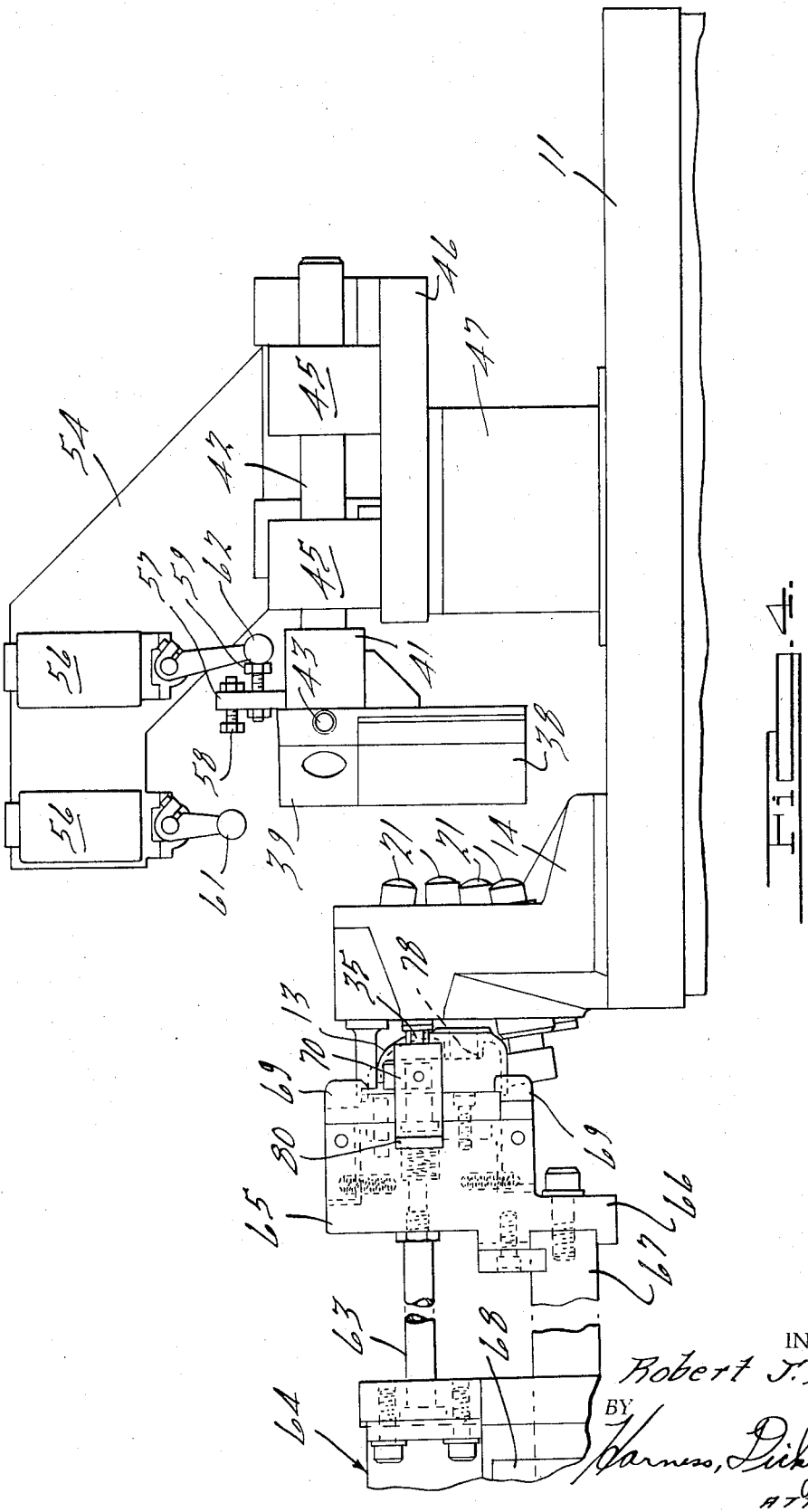

3,771,780

CLAMPING DEVICE FOR AN ACCURATELY LOCATED WORKPIECE

SUMMARY OF THE INVENTION

The invention pertains to a clamping device having a plurality of spring pressed plungers located in sloping angular positions about the centerline of the device. The forward diverging ends of the plungers have a head thereon with a clamping face which will move toward the workpiece wall when the springs move the plungers and heads to the rear. A plurality of the clamping devices are mounted on a rotatable table which is angularly advanced in equal angular increments to have the devices located seriatim at different machine stations and at loading and unloading stations. The workpiece is a cup-like element on which work operations are to be performed located from the interior surface thereof.

At the loading and unloading stations a ram actuates a head which advances the plungers of two adjacent stations, one of which releases a workpiece while the other of which receives a workpiece. The received workpiece is accurately located on a head of a supporting ram which is advanced thereby to accurately locate the workpiece on the support of the device. Upon the reversal of the ram which advanced the plungers, the plungers are free to be retracted by the individual springs which moves the heads rearwardly and towards the side wall of the workpiece to grasp the workpiece in the position in which it was located from the interior surface thereof. The work supporting head is retracted by its ram and the table is advanced so that drilling, reaming, facing and other operations can be performed seriatim on the workpieces supported on the plurality of the clamping devices.

BRIEF DESCRIPTION OF THE DRAWINGS

FIG. 1 is a broken plan view of a machine having a plurality of clamping devices thereon which embody features of the present invention;

FIG. 2 is an end view of a clamping device as viewed from point 2 of FIG. 1;

FIG. 3 is a sectional view of the structure illustrated in FIG. 2, taken on the line 3—3 thereof, and FIG. 4 is a view of the structure illustrated in FIG. 1, with the workpiece advanced and accurately located by a reciprocal supporting structure.

DESCRIPTION OF THE PREFERRED EMBODIMENTS

A table 11 has a plurality of clamping devices 12 mounted thereon which support a workpiece 13 on the outer faces thereof. The table is rotated about its center in increments to move the devices 12 from one work station to another until the workpiece is removed at an unloading station after being machined. The unloaded device 12 is advanced to a loading station where a new workpiece to be machined is accurately located and clamped to the device. Each device 12 has a housing 14 which is secured by screws 15 to the table. In the device herein illustrated, seven holes 16 are bored through the body at an angle of approximately 7° to have the centerlines converge rearwardly toward the centerline of the device. Each bore 16 has a sleeve 18 secured therein by the head of a screw 19 while being sealed to a plunger 21 mounted therein by sealing rings 22. The outer end of the plunger 21 supports a head 23 located thereon by a dowel 24 and secured thereto by a screw 25.

The heads 23 are cylindrical and are provided with a flat face 26 machined at the angle at which the plungers are located so as to be parallel to the wall of the workpiece 13. The plunger is hollow for receiving a spring 27 engaged by spacers 28 at each end one abutting the bottom of the aperture 29 the opposite one abutting a pin 31 which extends through a slot 32 in the plunger into apertures 33 in the sleeve 18. The flat faces 26 of the heads 23 surround the workpiece 13 in position to move inward when the plungers 21 are retracted by the springs 27 to be operated individually into engagement with the outer surface of the side wall 34 of the workpiece. Locating pins 35 extend outwardly from the outer face of the device for aligning the locating and machine heads relative thereto at a station to which the device was advanced.

The plungers 21 extend rearwardly from the housing 14 in position to be moved forwardly at the unloading station 36 and the adjacent loading station 37 by plates 38 mounted on a head 39. The head 39 has a pair of sleeves 41 extending rearwardly thereof in which slide rods 42 are secured by set screws 43. The rods are mounted in bearings 44 in bushings 45 which are supported on a platform 46 on a base 47 which is secured to the table 11. The bearings 44 are retained within the bushings 45 by set screws 45. A ram 49 is mounted on the platform 46 having its piston rod 51 secured to the head 39 by a screw 52 having its head located within a T-slot 53. When the head 39 is moved forwardly by the outward movement of the piston rod 51 the plates 38 advance outwardly to engage the plungers 21 of the two adjacent devices 12 at the unloading and loading stations 36 and 37. The movement of the plungers outwardly moves the heads 23 outwardly and the faces 26 thereof away from the wall 34 of the finished workpiece at the unloading station 36 to permit it to be removed. The outward movement of the heads 23 at the loading station 37 permits a workpiece to be machined to be moved into engagement with the device.

A plate 54 is secured to the platform 46 by screws 55 to extend upwardly and forwardly as illustrated in FIGS. 1 and 4 for supporting a pair of switches 56. The head 39 supports an arm 57 on which screws 58 and 59 are adjustably mounted. The screw 58 operates an arm 61 on one of the switches 56 when the head 39 is in advanced position while the head of the screw 59 engages an arm 62 on the other switch 56 when the head 39 is in retracted position.

At the loading station a piston rod 63 of a ram 64 carries a head 65 having an exterior face which accurately locates the workpiece 13 thereon. Pivoted spring pressed fingers 69 hold the workpiece on the end of the head 65 in a manner to permit the heads 23 to move into engagement with the workpiece 13. The head 65 has a downwardly extending arm 66 to which a square rod 67 is secured for passing through a square aperture in spaced blocks 68 located below the ram 64. The rod prevents the piston rod 63 from turning to thereby accurately locate the workpiece against the clamping device 12 aided by the engagement of a pair of sockets 70 on the end of a spring pressed crossmember 80 on the head 65 with the locating pins 35.

The workpiece 13 has two screw-receiving apertured recesses which rest on the ends of arms 71 of a U-shaped element 72 which is secured to the outer face of the housing 14 by screws 73. A locating pin 74 is mounted above the element 72 in position to extend into a screw-receiving recess 75 through which a hole is to be drilled. An aperture 76 of greater diameter than that of the hole to be drilled extends into the end of the pin 74, the front face of which may be relieved at 77 to prevent interference with the wall of the screw-receiving recess 75. The advancement of the head 65 by the ram 64 moves the workpiece 13 against the ends of the pin 74 and arms 71 and accurately locates it thereon when the sockets 70 engage the locating pins 35. The rearward movement of the head 39 permits the plungers 21 to be retracted by their individual springs 27 drawing the heads 23 rearwardly along the converging angular paths which move the faces 26 inwardly into engagement with the outer surface of the wall 34 of the workpiece 13. This clamps the workpiece on the supporting pin 72 and arms 71 exactly in the position it is held by the head 65 located from the internal surface of the workpiece.

Thereafter the piston rod 63 is retracted by the ram 64 and the table 11 is advanced angularly to move the clamping device 12 and the secured workpiece to the next adjacent section. A pair of limit switches (not shown) are actuated by the ram 64 at the end of its forward and rearward movements in the same manner as the ram 49 actuates the switches 56. At the stations, holes may be drilled in the workpiece 13 from the inside thereof and the hole 78 reamed, the outer edge 79 can be faced and any other machine operations may be performed at the various machining stations to which the clamping devices 12 are advanced.

Each time the piston rod 51 of the ram 49 is advanced, a finished workpiece is removed from the device at the unloading station 36 and a new workpiece clamped in the device at the loading station 37. After the workpiece 13 is located by the head 65, the retraction of the head 39 permits the plungers 21 to move the flat faces 26 of the heads 23 into clamping engagement with the outer surface of the wall 34 of the workpiece. The heads 23 are retracted the same or different amounts depending upon the location of the outer surface of the workpiece wall. The workpiece 13 is clamped in this manner on the supporting pin 72 and arms 71 when accurately held thereon by the head 65 which locates the workpiece from the internal surface thereof.

I claim:

1. In a clamping device for a workpiece, a housing, a plurality of spaced plungers carried by said housing about the center line thereof extending therefrom and converging rearwardly theretoward, spring means carried by said plungers urging them toward the rear, heads on the forward portion of the plungers each having an engaging surface presented toward the workpiece, support means for the workpiece on the front of the housing for positioning said workpiece between said heads, reciprocal means at the rear of the housing spaced from said plungers, and means for advancing said reciprocating means into engagement with said plungers for moving the plungers forwardly to workpiece disengaged position while compressing said spring means.

2. In a clamping device as recited in claim 1, wherein workpiece locating means accurately positions the workpiece between the plunger heads when in forward position to permit the heads to be individually moved by said spring means to engage the outer surface of the workpiece in the position it is held as said reciprocal means is moved from engagement with said plungers.

3. In a clamping device as recited in claim 2, wherein the workpiece is supported on the locating means by the engagement of the internal surface thereof.

4. In a clamping device as recited in claim 3, wherein the workpiece is cuplike in shape supported by its internal surface on the locating means with its outer surface engaged by the plunger heads during the time the workpiece is accurately located.

5. In a clamping device, a support, a plurality of plungers having fixed heads thereon mounted on said support about stop means against which a workpiece is to be supported, ram means for supporting a cup-shaped workpiece having a sidewall and a bottom by its inner surface and advancing it to a position between said heads until the bottom engages said stop means, springs on each said plunger which individually move the heads to engage the outer surface of the workpiece in the position retained by said ram means to permit machining to be performed on the inside of the workpiece when the ram means is removed, said plungers converging toward the rear of said support, said heads having workpiece engaging surfaces presented theretoward, and means for advancing said plungers forwardly to compress the springs and release a workpiece, each plunger being retracted by its spring when the advancing means is retracted to cause the engaging surfaces on the heads to move rearwardly and toward the workpiece the amount necessary to move into engagement therewith for clamping the workpiece in the position in which it is held.

6. In a clamping device as recited in claim 5, wherein means are provided for retracting the ram means and moving it away from the workpiece after the workpiece is clamped to the device.

7. In a clamping device as recited in claim 5, wherein the ram means has a supporting head for the workpiece, sockets on said head having an aperture presenting forwardly, and pins on said support engaged by said apertures for accurately locating the workpiece when moved against the support.

8. In a clamping device as recited in claim 7, wherein a ram moves the plungers and heads forwardly to release a workpiece at an unloading station, said ram also moving the plungers and heads forwardly at an adjacent loading station permitting a finished workpiece to be removed and a workpiece to be machined to be clamped.

* * * * *